US009610808B2

(12) United States Patent
Misani et al.

(10) Patent No.: US 9,610,808 B2
(45) Date of Patent: Apr. 4, 2017

(54) TYRE FOR MOTORCYCLES

(71) Applicant: PIRELLI TYRE S.p.A, Milan (IT)

(72) Inventors: Pierangelo Misani, Milan (IT); Mario Mariani, Milan (IT); Paolo Brivio, Milan (IT); Silvio Montanari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 371 days.

(21) Appl. No.: 14/346,430

(22) PCT Filed: Sep. 27, 2012

(86) PCT No.: PCT/IB2012/001909
§ 371 (c)(1),
(2) Date: Mar. 21, 2014

(87) PCT Pub. No.: WO2013/046004
PCT Pub. Date: Apr. 4, 2013

(65) Prior Publication Data
US 2014/0230978 A1 Aug. 21, 2014

Related U.S. Application Data

(60) Provisional application No. 61/581,052, filed on Dec. 28, 2011.

(30) Foreign Application Priority Data

Sep. 29, 2011 (IT) .............................. RM2011A0513

(51) Int. Cl.
*B60C 11/00* (2006.01)
*B60C 11/03* (2006.01)
(Continued)

(52) U.S. Cl.
CPC ........ *B60C 11/033* (2013.04); *B60C 11/0302* (2013.04); *B60C 11/0304* (2013.04);
(Continued)

(58) Field of Classification Search
CPC ....... B60C 11/00; B60C 11/03; B60C 11/032; B60C 11/0327; B60C 11/033
See application file for complete search history.

(56) References Cited

U.S. PATENT DOCUMENTS 4,364,426 A    12/1982   Mills et al.
2011/0100518 A1*   5/2011   Mariani .................... B60C 3/04
                                                                                                                                                   152/209.18
(Continued)

FOREIGN PATENT DOCUMENTS

DE         3431045    *   3/1985
EP         2 332 746       6/2011
(Continued)

OTHER PUBLICATIONS

International Search Report from the European Patent Office for International Application No. PCT/IB2012/001909, mailing date Apr. 26, 2013.
(Continued)

*Primary Examiner* — Justin Fischer
(74) *Attorney, Agent, or Firm* — Finnegan, Henderson, Farabow, Garrett & Dunner, L.L.P.

(57) ABSTRACT

Tire for motorcycles, having a tread band includes a central annular portion symmetrically located astride an equatorial plane and two shoulder annular portions located on axially opposite sides with respect to the central annular portion. The tread band has a void-to-rubber ratio not greater than 25%. The central annular portion has an axial extension not greater than 65% of the axial development of the tread band and the central portion has at least one module circumfer- (Continued)

entially repeated. Each shoulder portion has an axial extension not greater than 40% of the axial development of the tread band and the module includes at least one pair of first grooves with substantially circumferential course, at least partially located on opposite sides with respect to the equatorial plane. The central annular portion has a void-to-rubber ratio not smaller than 10% and the module includes a plurality of second grooves located substantially transversally with respect to the equatorial plane. The substantially transverse second grooves define in each module together with said first grooves at least two tread band solid portions. The second grooves have at least one end spaced away from the adjacent first groove by a distance so as to form a substantially continuous tread portion adapted to connect at least two tread band solid portions.

27 Claims, 5 Drawing Sheets

(51) Int. Cl.
*B60C 11/13* (2006.01)
*B60C 19/00* (2006.01)

(52) U.S. Cl.
CPC .... *B60C 19/001* (2013.01); *B60C 2011/0358* (2013.04); *B60C 2011/0374* (2013.04); *B60C 2011/0381* (2013.04); *B60C 2200/10* (2013.04)

(56) References Cited

U.S. PATENT DOCUMENTS

| | | |
|---|---|---|
| 2011/0132509 A1 | 6/2011 | Kasai |
| 2011/0162769 A1 | 7/2011 | Mariani et al. |
| 2012/0285593 A1 | 11/2012 | Mariani et al. |

FOREIGN PATENT DOCUMENTS

| | | |
|---|---|---|
| JP | 61-92903 | 5/1986 |
| JP | 2007-331596 | 12/2007 |
| JP | 5201207 | 2/2013 |
| WO | WO 2009/153821 | 12/2009 |
| WO | WO 2011/080566 | 7/2011 |

OTHER PUBLICATIONS

Written Opinion of the International Searching Authority from the European Patent Office for International Application PCT/IB2012/001909, mailing date Apr. 26, 2013.

* cited by examiner

TYRE FOR MOTORCYCLES

CROSS REFERENCE TO RELATED APPLICATIONS

This application is a national phase application based on PCT/IB2012/001909, filed Sep. 27, 2012, which claims the priority of Italian Patent Application No. RM2011A000513, filed Sep. 29, 2011, and the benefit of U.S. Provisional Application No. 61/581,052, filed Dec. 28, 2011, the content of each application being incorporated herein by reference.

FIELD OF THE INVENTION

The present invention relates to tyres for motorcycles. In particular, the present invention relates to tyres intended to be mounted on the front wheel and/or on the rear wheel of "big enduro or dual purpose" motorcycles having medium-large engine capacity (e.g. 600-1200 $cm^3$ or higher), and/or medium-high power (e.g. about 70 hp or higher) and motorcycle mass in driving configuration for example equal to 150 kg or higher.

PRIOR ART

Tyres for motorcycles are for example known from U.S. Pat. No. 4,364,426 and JP 61092903.

U.S. Pat. No. 4,364,426 describes a tyre for motorcycles having a tread provided with a plurality of spaced blocks defined by a plurality of first grooves spaced circumferentially and extending substantially diagonally across a tread. The first grooves channel water from the center of the tread and extend continuously from one tread edge to the other. Each first groove further comprises an intermediate portion which extends substantially circumferentially. The intermediate portions of two adjacent first grooves are spaced by a block defined by adjacent first grooves.

JP 61092903 describes a tyre for on-off motorcycles adapted to ensure uniform contact by providing on the tread band a plurality of blocks, disposed in the circumferential direction of a tyre. The upper edge of at least one side of the blocks is arranged so as to be positioned at both lateral edges of the tread band to protrude outward from the contour of the tread central portion.

SUMMARY OF THE INVENTION

In recent times a trend has been observed to introduce into the market motorcycles for "big enduro or dual purpose" use having increasingly higher engine capacity and/or power, intended for mixed running conditions both on roads and off-road. In fact, for example, motorcycles for use on roads and off-road having an engine capacity of 1200 $cm^3$, with powers of about 110 hp and motorcycle mass in driving configuration of about 240 kg are already present in the market.

The tyres mounted on the wheels of such motorcycles shall ensure a stable behavior both when running on roads (for example, in towns, on motorways, on mountain roads with a large number of bends) and when running off-road, together with a high mileage.

Excellent features of grip to the ground and traction are required from the tyres mounted on the aforesaid motorcycles, so that even considerable torques can be effectively transferred to the ground on different kind of terrains, and an effective braking action can be ensured. Moreover, such tyres shall ensure grip, roadholding and traction when running on wet ground and on off-road ground.

Comfort and wear evenness features when running on roads are also required from such tyres. Reliability and performances on road surfaces with reduced grip are also required, being such tyres intended for a motorcycle class often used during the whole year.

In the Applicant's experience, the aforesaid features are partially conflicting with one another, particularly in tyres for motorcycles intended for such different running conditions.

The Applicant has noted that in practice a high traction of the tyre when running off-road may cause the tyre performances in terms of mileage and noise/vibrations to be reduced.

The Applicant has further observed that better tyre performances for running on roads may cause the tyre performances in terms of traction, controllability and steerability on slippery, sandy and/or muddy terrains to be reduced.

The Applicant has found a tread pattern suitable to meet the at least partially conflicting requirements mentioned above.

Said tread pattern is provided in its central portion, substantially astride the equatorial plane, with a sequence of tread solid portions, circumferentially and axially delimited by deep grooves and at least for the most part substantially connected with one another and located so as to form a substantially continuous circumferential region, preferably extending over the whole tread band.

By means of the aforesaid tread pattern the tyre is able to provide the desired performances in terms of traction and roadholding on dirt and rough grounds, and to provide performances in terms of grip and stability when running on roads, as well as water drainage on wet grounds in any running condition.

In a first aspect thereof, the present invention relates to a tyre for motorcycles, having a tread band comprising a central annular portion (A) symmetrically located astride an equatorial plane (X-X) and two shoulder annular portions (B) located on axially opposite sides with respect to the central annular portion (A).

The present invention, in one or more preferred aspects, may comprise one or more of the features hereinafter presented.

Preferably, the tread band may have a void-to-rubber ratio not greater than 25%.

Advantageously, the central annular portion (A) may have an axial extension not greater than 65% of the axial development of the tread band and comprises at least one module circumferentially repeated with a predetermined pitch.

Conveniently, each shoulder portion (B) may have an axial extension not greater than 40% of the axial development of the tread band.

Preferably, the module comprises at least one pair of substantially circumferential first grooves, at least partially located on opposite sides with respect to the equatorial plane (X-X).

Conveniently, the central annular portion (A) has a void-to-rubber ratio not smaller than 10% and said module comprises a plurality of second grooves located substantially transversally with respect to the equatorial plane (X-X).

Advantageously, the transverse second grooves define in said module, together with the substantially circumferential first grooves, at least two tread band solid portions.

Preferably, the second grooves have at least one end spaced away from an adjacent first groove by a distance (s)

so as to form a substantially continuous tread portion adapted to connect at least two tread band solid portions.

Conveniently, the first grooves, as well as the second grooves, may have extensions different from one another.

Advantageously, the first groove of lesser extension has an extension greater than or equal to the second groove of greatest extension.

The Applicant has observed that such an arrangement and configuration of the second grooves allows good traction features in the longitudinal direction to be achieved, without reducing the grip effect of the central portion of the tread band and without causing excessive vibrations, noise and uneven wear phenomena. The Applicant is of the opinion that such an improvement is due to a proper balancing between the rate of corners formed by the outer edges of the second grooves, which ensure traction, and the rate of tread band solid portions with reduced mobility in the circumferential direction.

The Applicant has further observed that by delimiting through the substantially circumferential first grooves the solid portions created in the module, a greater stiffness is provided to the central portion of the tread band, which is advantageous for reducing the tyre wear and for the driving stability. Moreover, in this way the traction of the tyre when running on off-road terrains at small lean angles of the vehicle is promoted.

By tread band solid portion it is meant a tread band portion having a substantially zero void-to-rubber ratio, delimited by consecutive groove segments both in the axial and in the circumferential direction, wherein at least one of said segments is not connected with the previous one.

By substantially continuous tread portion it is meant a tread portion substantially without relevant discontinuities which prevent the stress transmission to neighboring regions.

By such expression it is meant to designate a tread portion, comprised between an end of a second groove and an adjacent segment of a first groove, in which the void-to-rubber ratio is substantially zero, as well as a tread portion, comprised between an end of a second groove and an adjacent segment of a first groove, in which the volume of rubber is greater by a predetermined amount, for example 50%, than the volume of rubber which one should remove for connecting said second groove with the segment of first groove.

This volume of rubber can be thought, for example, as an ideal parallelepiped having a height defined by the distance s and a base defined by a rectangle having the width and the average depth of the second groove as its dimensions.

Within the definition given above, therefore, fall both the case in which one or more thin (e.g. having an average width smaller than 2 mm) sipes are present between the end of a second groove and a segment of the first groove, and, for example, the case in which the end of the second groove is connected with the first groove and the connection segment has, for example, a noticeable depth reduction.

By "tread pattern" it is meant the representation of each point of the tread band (grooves included) on a plane perpendicular to the equatorial plane of the tyre and tangent to the maximum diameter of the tyre. In the representation:
   in the axial direction the distance of each point of the tread band from the equatorial plane corresponds to the distance of such point from the equatorial plane measured on the axial development of the band itself;
   in the circumferential direction the distance between any two points of the tread band corresponds to the distance between the projections of the two points on the circumference corresponding to the maximum diameter of the tyre, the projection being obtained by means of radial planes passing at the two points.

Angular measurements, and/or linear quantities (distances, widths, lengths, etc.), and/or areas are to be intended as referred to the tread pattern as defined above.

Referring to the angular arrangement of the grooves formed in the tread band with respect to the equatorial plane of the tyre, such an angular arrangement is to be intended, for each point of the groove, as referred to the angle (between 0° and 180°) formed by a rotation made starting from the equatorial plane up to the direction tangent to the groove passing through that point. The rotation is meant to be performed by a vector initially lying along the direction defined, in the tread pattern, by the equatorial plane, and oriented opposite to the predetermined rotation direction of the tyre.

The following definitions further apply:
   By "tyre for motorcycles" it is meant a tyre having a high curvature ratio (typically higher than 0.20), which allows high camber angles to be reached when running on a bend.
   By "equatorial plane" of the tyre it is meant a plane perpendicular to the rotation axis of the tyre and dividing the tyre into two symmetrically equal portions.
   By "circumferential" direction it is meant a direction generically directed according to the rotation direction of the tyre, or in any case only slightly inclined with respect to the rotation direction of the tyre.
   By "void-to-rubber ratio" it is meant the ratio between the total surface of the grooves of a determined portion of the tread pattern of the tyre (possibly of the whole tread pattern) and the total surface of the determined portion of the tread pattern (possibly of the whole tread pattern).
   By "axial development" of the tread band it is meant the length L of the arc defining the radially outermost profile of the tread band in a radial section of the tyre.
   By "curvature ratio" of the tyre it is meant the ratio between the distance of the radially highest point of the tread band from the maximum chord of the tyre, and the same maximum chord of the tyre, in a radial section of the tyre.
   By "average inclination of a groove" it is meant the arithmetical mean of the punctual inclinations of the groove itself with respect to the equatorial plane (X-X) measured along the extension of the groove.
   By "average depth of a groove" it is meant the arithmetical mean of the punctual depths of the groove itself measured along the extension of the groove.
   By "average width of a groove" it is meant the arithmetical mean of the punctual widths of the groove itself measured along the extension of the groove.

Preferably, at least one of the second grooves has at least two ends, each spaced away from an adjacent first groove by said distance (s) so as to form a substantially continuous tread portion adapted to connect at least two tread band solid portions.

Advantageously, the first groove of lesser extension has an extension greater than the second groove of greatest extension.

For not making the central portion of the tyre excessively mobile and at the same time not reducing the draining effect in such portion, the first and the second grooves advantageously have an average depth smaller than 10 mm.

Preferably, the first and the second grooves have an average depth greater than 4 mm in the case of a tyre intended to be mounted on the front wheel of a motorcycle and greater than 7 mm in the case of a tyre intended to be mounted on the rear wheel of a motorcycle.

For providing a suitable amount of rubber between the end of a second groove and an adjacent segment of a first groove, the distance s is conveniently greater than 0.01 L.

Preferably, the distance s is greater than or equal to 2 mm.

For not excessively reducing the transverse extension of the second grooves, the distance s is conveniently smaller than 0.2 L.

The aforesaid choice ensures a high rate of corners formed by the outer edges of the second grooves in the central annular portion (A), thus promoting traction in the circumferential direction.

Preferably, the second grooves are the sole grooves which can break the substantial continuity in the circumferential direction of the tread band in the central annular portion (A).

Preferably, between two circumferentially adjacent modules no further transverse grooves adapted to break the substantial continuity in the circumferential direction of the tread band in the central annular portion (A) are provided.

Preferably, all of the axial ends of the second grooves are spaced away from the first grooves so as to form a tread portion substantially continuous in the circumferential direction.

Advantageously, the second grooves comprise at least one first segment and at least one second segment inclined with respect to the first segment to form a convexity oriented discordantly with respect to the rolling direction of the tyre, in the case of a tyre intended to be mounted on the front wheel of a motorcycle, and concordantly with respect to the rolling direction of the tyre in the case of a tyre intended to be mounted on the rear wheel of a motorcycle.

Advantageously, for providing a balanced driving on softer terrains, said first and second segments of the second grooves are inclined with respect to each other to form a vertex.

Conveniently, the first segment of the second grooves is inclined with respect to the equatorial plane so as to form an angle α comprised in the range between 90° and 140° for the front tyre and comprised in the range between 0° and 45° for the rear tyre.

Conveniently, the second segment of the second grooves is inclined with respect to the equatorial plane so as to form an angle β comprised in the range between 90° and 140° for the front tyre and comprised in the range between 0° and 40° for the rear tyre.

Preferably, the first and second segments converging to form each vertex have the same orientation in the circumferential direction.

Preferably, the first and second segments of the second grooves have different extensions.

Conveniently, the vertexes of the second grooves are axially spaced away from the equatorial plane (X-X). The spacing in the axial direction of the vertexes of the second grooves increases the stiffness of the central portion at the equatorial plane and reduces the possibility of triggering uneven wear phenomena.

Preferably, in each module the vertexes of two circumferentially consecutive second grooves are located axially on opposite sides with respect to the equatorial plane (X-X).

This arrangement is advantageous, since the staggering of the vertexes reduces the noise while the tyre is in use. The aforesaid arrangement is preferably obtained by alternating in the circumferential direction the first and second segments of the second grooves present in each module.

Preferably, the first segments of the second grooves have an extension greater than the second segments.

Preferably, in each module at least one second groove is located between two circumferential first grooves so as to cross the equatorial plane (X-X).

Preferably, in each module at least two second grooves are located between two circumferential first grooves so as to cross the equatorial plane (X-X).

Advantageously, the second grooves have an axial extension smaller than 0.4 L. Preferably, the second grooves have an axial extension smaller than 0.3 L.

For ensuring a good traction in the central portion (A), the transverse second grooves have an axial extension greater than 0.1 L.

Advantageously, in each module the first grooves of each pair are mutually staggered in the circumferential direction.

Preferably, in each module the first grooves of each pair are mutually staggered in the circumferential direction at most by half the pitch.

The staggered arrangement in the circumferential direction advantageously increases the stiffness of the tyre at the central portion (A).

Conveniently, for reducing the triggering of uneven wear phenomena and the presence of points subjected to a high stress, in each module the first grooves of each pair of first grooves are arranged according to an arc of a circle.

Conveniently, each shoulder portion (B) has an axial extension not greater than 40% of the axial development of the tread band, preferably an axial extension greater than 5% of the axial development of the tread band.

Advantageously, each shoulder portion (B) may comprise a plurality of lateral grooves extending substantially transversally with respect to the equatorial plane (X-X).

Advantageously, for ensuring a better wear resistance the lateral grooves are inclined with respect to the equatorial plane so as to have an average inclination relative to the equatorial plane (X-X), considered with reference to the rolling direction, smaller than 90° in the front tyre and greater than 90° in the rear tyre.

Preferably, the axially inner end of the lateral grooves is located circumferentially substantially at the end of the second grooves.

Advantageously, for each module at least one second groove is connected with a lateral groove.

Preferably, for each module at least two second grooves are connected with two lateral grooves.

Advantageously, for each module at least one lateral groove is connected with a first groove.

Preferably, for each module at least two lateral grooves are connected with two first grooves.

BRIEF DESCRIPTION OF THE DRAWINGS

Further features and advantages of the tyre of the present invention will become more apparent from the following detailed description of some embodiments thereof, made hereafter with reference to the accompanying drawings by way of non-limiting example only. In the drawings:

In FIG. 1 a tyre for motorcycle wheels according to the present invention is generally indicated at 100. This tyre is preferably intended to be used on a wheel of a motorcycle of the "big enduro or dual purpose" segment.

Figure 1:
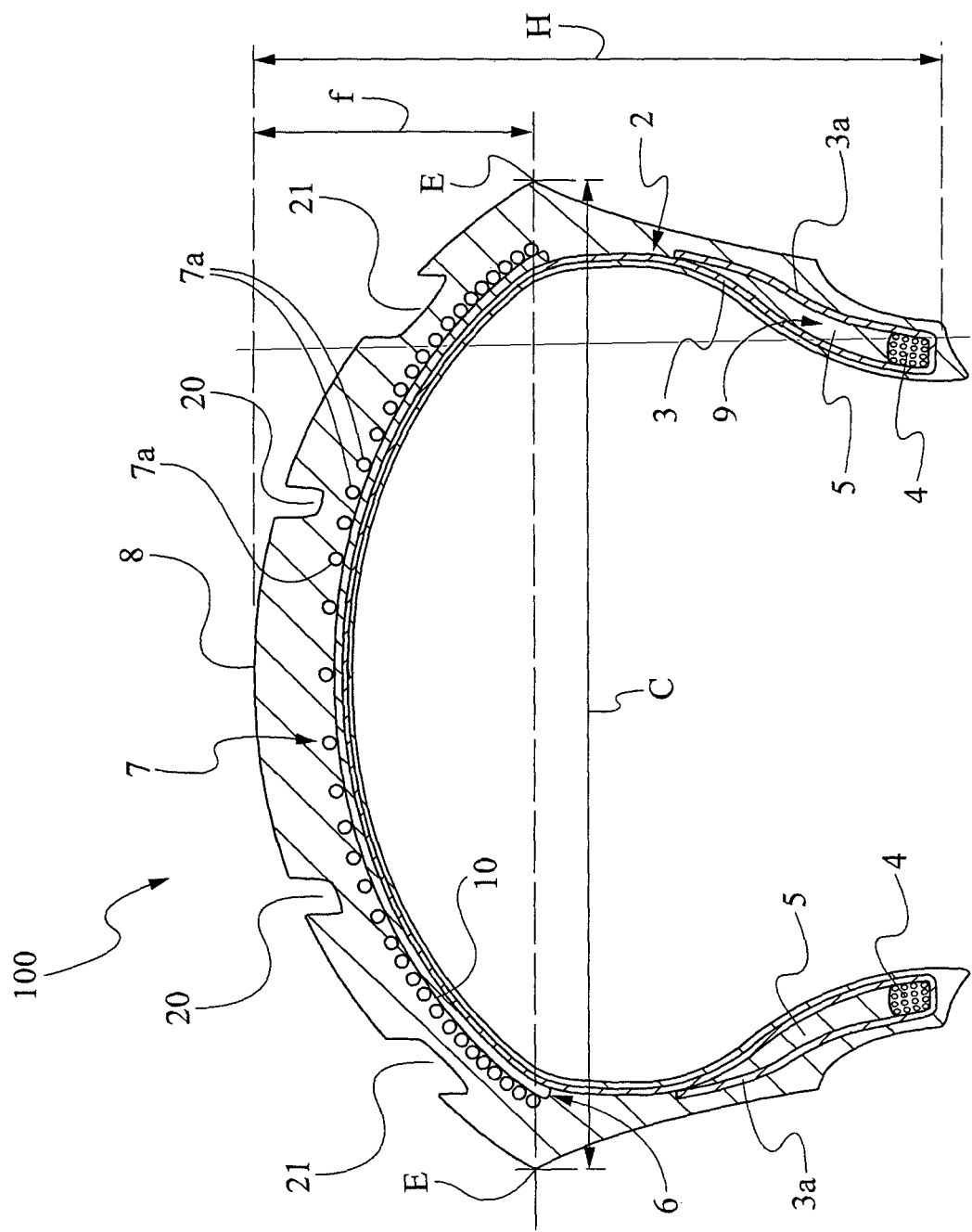
FIG. 1 shows a radial sectional view of a tyre according to the invention.

An equatorial plane X-X and a rotation axis Z (not shown in the figures) are defined in the tyre 100. Moreover, there are defined a circumferential direction (indicated in the figures by an arrow F pointing in the rotation direction of the tyre) and an axial direction, perpendicular to the equatorial plane X-X.

The tyre 100 comprises a carcass structure 2 including at least one carcass ply 3, made of an elastomeric material and comprising a plurality of reinforcing elements arranged parallel to one another.

The carcass ply 3 engages, by means of its opposite circumferential edges, at least one annular reinforcing structure 9.

In particular, the opposite lateral edges 3a of the carcass ply 3 are turned up about annular reinforcing structures called bead rings.

A tapered elastomeric filling 5 taking up the space defined between the carcass ply 3 and the respective turned up lateral edge 3a of the carcass ply 3 is applied onto the axially outer perimeter edge of the bead rings 4.

As known, the tyre region comprising the bead ring 4 and the filling 5 forms the so-called bead, intended for anchoring the tyre to a respective fitting rim, not shown.

The reinforcing elements included in the carcass ply 3 preferably comprise textile cords, selected from those usually adopted in the manufacture of carcasses for tyres, for example nylon, rayon, PET, PEN cords, with an elementary thread having a diameter between 0.35 mm and 1.5 mm.

In an embodiment not shown, the carcass structure has its opposite lateral edges associated without a turn-up with special annular reinforcing structures provided with two annular inserts. A filling of elastomeric material may be located in an axially outer position with respect to the first annular insert. The second annular insert is instead located in an axially outer position with respect to the end of the carcass ply. Finally, in a axially outer position with respect to said second annular insert, and not necessarily in contact with the same, a further filling can be provided which terminates the formation of the annular reinforcing structure.

A belt structure 6 is circumferentially applied, in a radially outer position, onto the carcass structure 2. A tread band 8 is circumferentially superimposed on the belt structure 6. Longitudinal and/or transverse grooves, arranged so as to define a desired tread pattern, are typically formed on the tread band 8, further to a moulding operation carried out at the same time as the vulcanization of the tyre.

The tyre 100 may comprise a pair of sidewalls laterally applied on opposite sides to said carcass structure 2.

The tyre 100 has a straight section characterised by a high transverse curvature.

In particular, the tyre 100 has a height H of the section, measured, at the equatorial plane, between the top of the tread band and the fitting diameter, defined by reference line r, passing through the tyre beads.

The tyre 100 further has a width C defined by the distance between the laterally opposite ends E of the tread itself, and a curvature defined by the specific value of the ratio between the distance f of the top of the tread from the line passing through the ends E of the tread itself, measured at the equatorial plane of the tyre, and the aforesaid width C. The ends E of the tread may be formed by a corner.

In the present description and in the subsequent claims, by tyres with high curvature tyres are meant which have a curvature ratio f/C not lower than 0.2, preferably f/C≥0.25, for example equal to 0.28. Preferably, the curvature ratio f/C is not greater than 0.8, preferably f/C≤0.5.

Preferably, the tyres have particularly low sidewalls (FIG. 1). In other words, by tyres with low or lowered sidewalls tyres are meant in which the sidewall height ratio (H−f)/H is lower than 0.7, more preferably lower than 0.65, for example equal to 0.6 for the rear tyre and 0.5 for the front tyre.

The carcass structure 2 is typically lined on its inner walls with a sealing layer, also called "liner", essentially consisting of a layer of an airproof elastomeric material, adapted to ensure the tight seal of the tyre itself after it has been inflated.

Preferably, the belt structure 6 consists of a layer 7 having a plurality of circumferential windings 7a axially arranged in side-by-side relationship, formed by a rubberized cord or by a rubberized strip comprising a number (preferably, from two to five) of cords, spirally wound at an angle substantially equal to zero (typically between 0° and 5°) with respect to the equatorial plane X-X of the tyre.

Preferably, the belt structure extends over the whole crown portion of the tyre.

In a preferred embodiment, the belt structure 6 may consist of at least two radially superimposed layers, each consisting of elastomeric material reinforced with cords arranged parallel to one another. The layers are arranged so that the cords of the first belt layer are oriented obliquely with respect to the equatorial plane of the tyre, whereas the cords of the second layer also have an oblique orientation, but symmetrically crossed with respect to the cords of the first layer (so-called "cross-belt").

In both cases, usually, the cords of the belt structure are textile or metal cords.

Preferably, the tyre 100 may comprise a layer 10 made of an elastomeric material, located between said carcass structure 2 and said belt structure 6 formed by said circumferential coils, said layer 10 preferably extending over a surface substantially corresponding to the surface on which the belt structure 6 develops. Alternatively, said layer 10 extends over a surface smaller than the surface on which the belt structure 6 develops, for example only over opposite lateral portions of the same.

In a further embodiment, an additional layer (not shown in FIG. 1) made of an elastomeric material is located between said belt structure 6 and said tread band 8, said layer preferably extending over a surface substantially corresponding to the surface on which said belt structure 6 develops. Alternatively, said layer extends only over at least a portion of the development of the belt structure 6, for example over opposite lateral portions of the same.

In a preferred embodiment, at least one of said layer and said additional layer comprises short aramid fibers, for example made of Kevlar®, dispersed in said elastomeric material.

According to a feature of the invention, the tread band 8 is divided into a central annular portion A and two shoulder annular portions B, symmetrically located with respect to the central annular portion.

The central annular portion A extends astride the equatorial plane X-X, over a width not greater than 65% of the axial development L of the tread band 8, for example over a width equal to 60% of said axial development.

The Applicant has noted that usually when driving a so-called big enduro motorcycle the camber angles to which the tyre is subjected when used off-road are smaller than the camber angles to which the same tyre is subjected when used on roads.

For this reason, the central annular portion A has a void-to-rubber ratio greater than the void-to-rubber ratio of the shoulder portions.

In particular, the central annular portion A has a void-to-rubber ratio greater than 0.18, for example equal to about 0.19, and each shoulder portion B has a void-to-rubber ratio smaller than 0.18, for example equal to 0.16.

In any case, the central annular portion A has a void-to-rubber ratio smaller than 25%.

The central annular portion A has a tread pattern comprising a module 14 repeated along a direction of circumferential development of the tyre.

Figure 2:
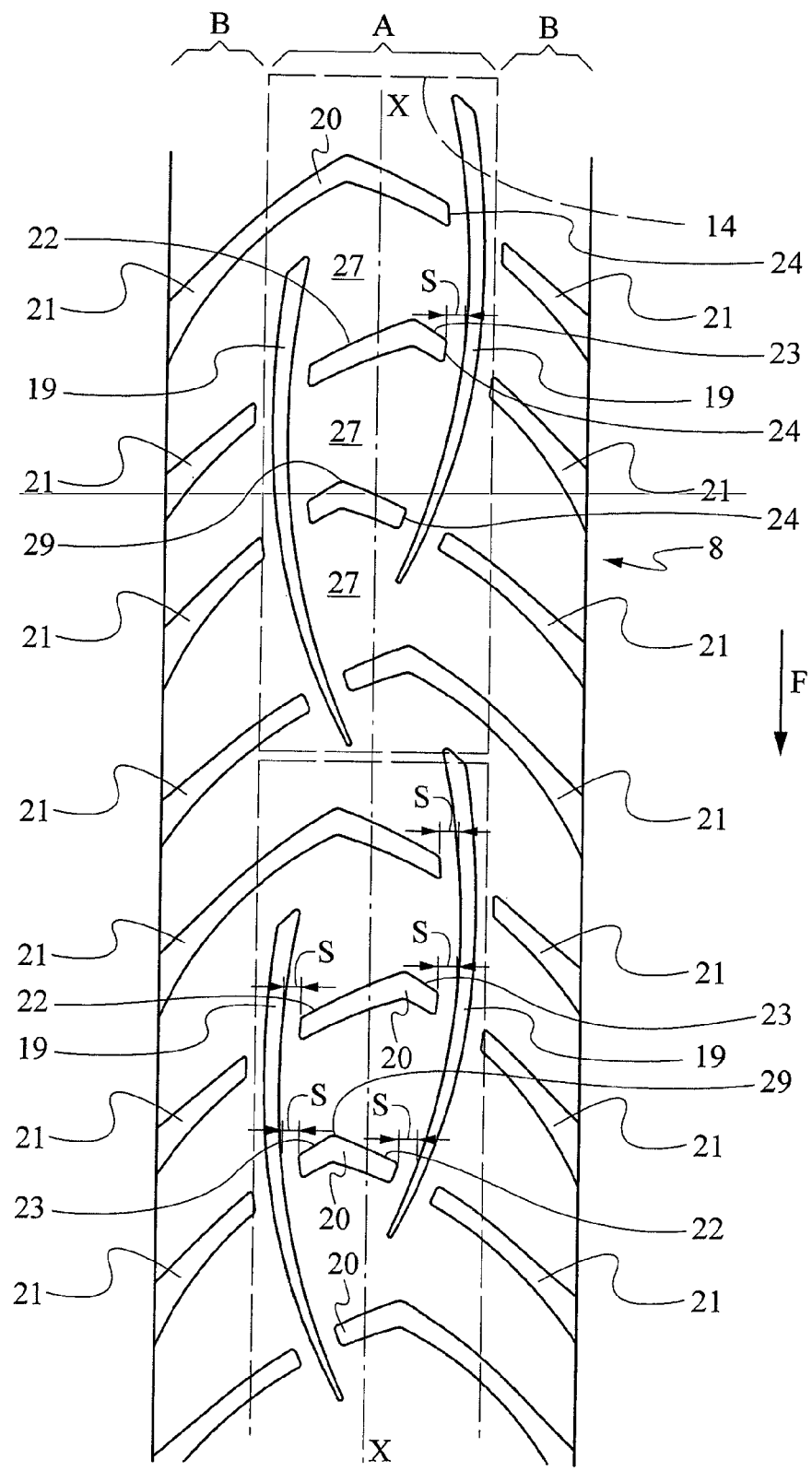
FIG. 2 shows a portion of the plan development of a portion of the tread band of a first embodiment of a front tyre according to the present invention.
Figure 3:
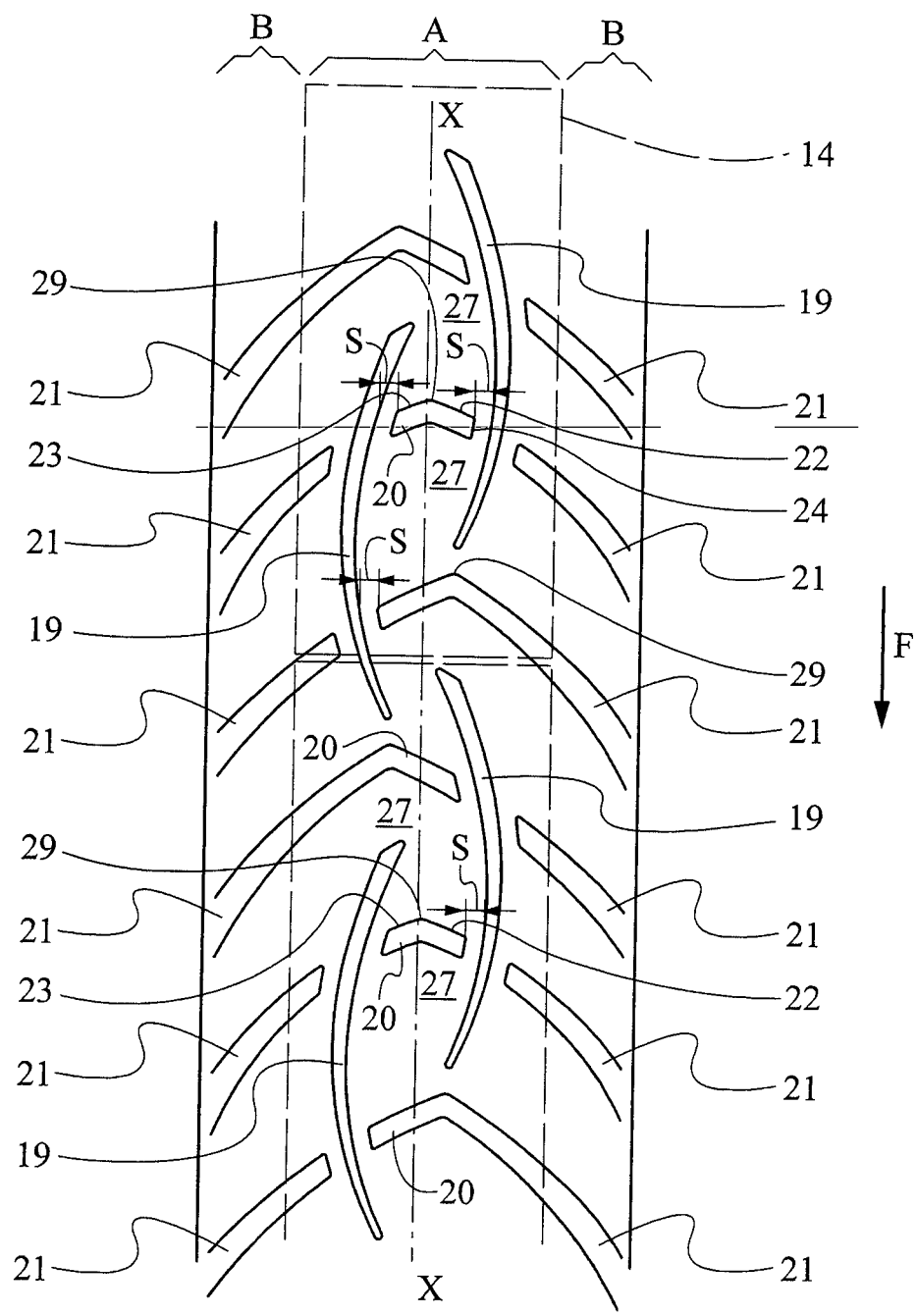
FIG. 3 shows a portion of the plan development of a portion of the tread band of a second embodiment of a front tyre according to the present invention.
Figure 5:
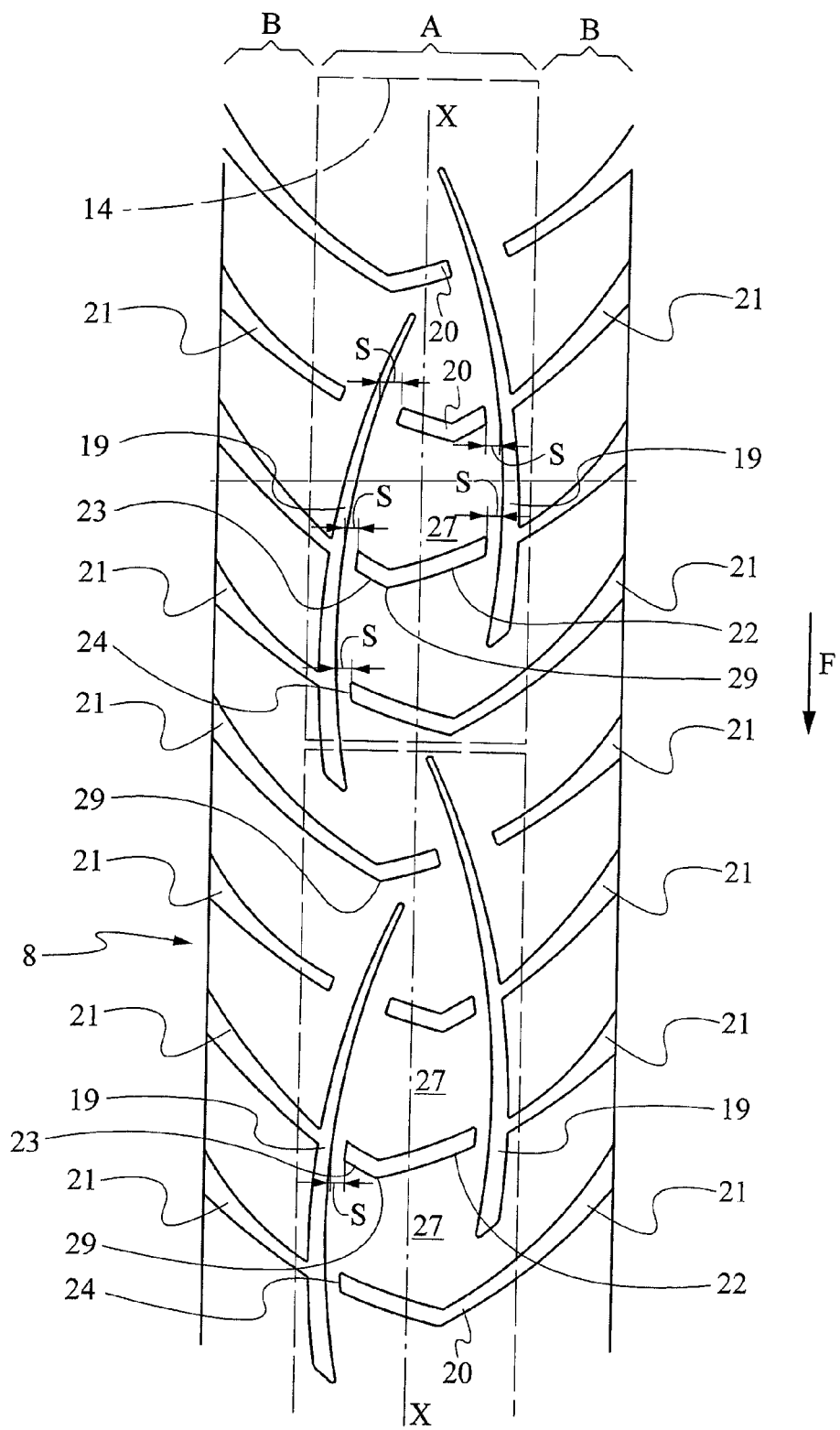
FIG. 5 shows a portion of the plan development of a portion of the tread band of a first embodiment of a rear tyre according to the present invention.

In particular, in the embodiment shown in FIGS. 2, 3, and 5 the module 14 is repeated astride the equatorial plane X-X.

The module 14 has at least one pair of first grooves 19, with substantially circumferential course, at least partially located on opposite sides with respect to the equatorial plane X-X.

Preferably, each first groove 19 extends only within the central annular portion A, in particular between the equatorial plane X-X and a shoulder portion B.

Conveniently, the first grooves 19, as well as the second grooves 20, may have extensions different from one another.

Advantageously, the groove of lesser extension between the first grooves 19 has an extension greater than or equal to that of the groove having the greatest extension between the second grooves 20.

Preferably, the groove of lesser extension between the first grooves 19 has an extension greater than that of the groove having the greatest extension between the second grooves 20.

The first grooves 19 have a draining function in the central annular portion A and therefore they have a circumferential extension greater than 1% of the total circumferential development of the tyre.

Preferably, each first groove has a circumferential extension smaller than 15% of the total circumferential development of the tyre.

Advantageously, each first groove has a circumferential extension smaller than 300 mm.

The first grooves 19 of each pair are mutually staggered in the circumferential direction. The circumferentially staggered arrangement of the first grooves 19 is embodied in particular as circumferentially staggered arrangement of the axially innermost ends of the first grooves 19.

Preferably, the first grooves 19 are staggered in the circumferential direction at most by half the pitch.

This choice for the arrangement and extension of the first grooves 19 contributes to increasing the stiffness of the central annular portion A, reducing the mobility of the tread band solid portions 27, hereinafter described in more detail.

The first grooves 19 have a width greater than 1.5 mm, preferably smaller than 9 mm.

The first grooves 19 of each module 14 have a width that varies in the circumferential direction. In particular, in the case of tyres mounted on the front wheel of a motorcycle the first grooves 19 have a width which decreases in the same direction as the rolling direction of the tyre, indicated by arrow F in FIGS. 2, 3 and 4.

Vice versa, in the case of tyres intended to be mounted on the rear wheels of a motorcycle, the first grooves 19 have a width which decreases in a direction opposite to the rolling direction F of the tyre, as shown in FIG. 5.

For ensuring an effective draining action in the central annular portion A, preferably the first grooves 19 have an average depth greater than 4 mm in the case of a tyre intended to be mounted on the front wheel of a motorcycle, and greater than 7 mm in the case of a tyre intended to be mounted on the rear wheel of a motorcycle.

For reducing the presence of points which trigger critical stresses, preferably the first grooves 19 of each pair are arranged along an arc of a circle.

The module 14 further comprises at least two, preferably three, substantially transverse second grooves 20 which cross the equatorial plane X-X.

The transverse second grooves 20 define in each module, together with the first grooves 19, tread band solid portions 27.

The second grooves 20 are arranged so as to have at least one axial end spaced away from the adjacent first groove 19.

As in the embodiments shown in FIGS. 2-5, the second grooves 20, and particularly at least one axial end 24 thereof, is spaced away from a first groove 19 by a distance s so as to form a substantially continuous tread portion adapted to connect at least two tread band solid portions 27.

Preferably, the second grooves 20 neither intersect nor touch the first grooves 19 so as to form a substantially continuous circumferential annular portion. The substantially continuous circumferential annular portion is represented by the sequence of solid portions 27 connected by the "bridges" formed by the spacing between the ends 24 of the second grooves 20 and the adjacent first grooves 19.

Each tread band solid portion 27 is thus represented by a portion of the tread band with substantially zero void-to-rubber ratio, delimited by segments of first grooves 19 in the axial direction and by second grooves or segments thereof in the circumferential direction.

At least one second groove 20 in each module 14 has the two axially outer ends 24 spaced away from an adjacent first groove 19 by the distance (s) so as to form a substantially continuous tread portion adapted to connect at least two tread band solid portions 27.

For providing, between the end 24 of a second groove 20 and an adjacent segment of a first groove 19, an amount of rubber suitable to reduce the mobility of the tread band solid portions 27, the distance s is conveniently greater than 0.01 L.

Preferably, the distance s is greater than or equal to 5 mm.

In order to avoid excessively reducing the transverse extension of the second grooves 20, the distance s is conveniently smaller than 0.2 L.

Preferably, the second grooves 20 are the sole grooves which can break the substantial continuity in the circumferential direction of the tread band in the central annular portion A.

In other words, between two circumferentially adjacent modules 14 no further transverse grooves adapted to break the substantial continuity in the circumferential direction of the tread band in the central annular portion A are provided.

The second grooves 20 have a lesser extension than that of the first grooves 19.

The second grooves 20 comprise at least one first segment 22 and at least one second segment 23 inclined with respect to the first segment 22 to form a convexity with a discordant, preferably opposite, orientation with respect to the rolling direction of the tyre, in the case of tyres intended to be mounted on the front wheel of a motorcycle.

Vice versa, in the case of tyres intended to be mounted on the rear wheel of a motorcycle, as in the embodiment of FIG. 5, the second grooves 20 comprise at least one first segment 22 and at least one second segment 23 inclined with respect to the first segment 22 to form a convexity with a concordant orientation with respect to the rolling direction of the tyre (arrow F in FIG. 5).

Conveniently, the first segment 22 of the second grooves is inclined with respect to the equatorial plane so as to form an angle $\alpha$ comprised in the range between 90° and 140° for the front tyre and comprised in the range between 0° and 45° for the rear tyre.

Conveniently, the second segment 23 of the second grooves is inclined with respect to the equatorial plane so as to form an angle $\beta$ comprised in the range between 90° and 140° for the front tyre and comprised in the range between 0° and 40° for the rear tyre.

The aforesaid choice increases the rate of corner portion of the second grooves 20, with advantage to the traction of the central annular portion A.

Preferably, as in the embodiments shown in FIGS. 2-5, in order to provide a balanced driving on softer terrains, the first 22 and the second segment 23 are inclined with respect to each other to form a vertex 29.

Referring to the embodiments shown in FIGS. 2-5, all of the vertexes 29 have the same orientation in the circumferential direction.

The vertexes 29 are axially spaced away from the equatorial plane X-X.

The aforesaid choice contributes to increasing the stiffness of the central annular portion A exactly at the equatorial plane X-X and to avoiding, or in any case reducing, the risk of triggering uneven wear phenomena at the vertexes 29 themselves.

Preferably, in a same module 14 the vertexes 29 of two circumferentially adjacent or consecutive second grooves 20 are located axially on opposite sides with respect to the equatorial plane X-X.

Such an arrangement of the vertexes 29 is obtained thanks to the different extension of the first segments 22 and the second segments 23 of the second grooves 20.

Preferably, in each module 14 the segment of lesser extension of a second groove 20 is positioned on an opposite side relative to the equatorial plane X-X with respect to the segment of lesser extension of the circumferentially adjacent second groove.

Preferably, the second grooves 20 have an average depth greater than 4 mm in the case of a tyre intended to be mounted on the front wheel of a motorcycle and greater than 7 mm in the case of a tyre intended to be mounted on the rear wheel of a motorcycle.

The second grooves 20 have an average width greater than 4 mm, preferably smaller than 12 mm Preferably, the second grooves 20 have an average width which varies along their extension.

Each shoulder portion B has an axial extension not greater than 40%, and preferably not smaller than 5%, of the axial development L of the tread band 8 and comprises a plurality of lateral grooves 21 extending substantially transversally with respect to the equatorial plane X-X.

Preferably, as in the embodiments shown in FIGS. 2-5, in the case of the front tyre the lateral grooves 21 are inclined with respect to the equatorial plane of the tyre so as to form an angle greater than 90°, preferably smaller than 140°.

In the rear tyre the lateral grooves 21 are inclined with respect to the equatorial plane of the tyre so as to form an angle comprised in the range between 0° and 40°.

The lateral grooves 21 of a first shoulder portion B are arranged substantially in the same way as the lateral grooves 21 of the other shoulder portion B.

In order to promote the draining of water, the lateral grooves 21 have a variable width along their extension and particularly an average width which increases moving axially from the centre of the tyre towards the axially outer shoulder edge.

For ensuring an effective draining, the lateral grooves 21 have a greater depth close to the central annular portion A.

Preferably, the depth of the lateral grooves 21 at the end close to the central annular portion is greater than 4 mm.

In FIG. 2 a tread band pattern of a first embodiment of a tyre according to the invention, particularly adapted to be mounted on the front wheel of a motorcycle, is shown.

The module 14 comprises four second grooves 20 located substantially transversally with respect to the equatorial plane X-X.

The two second grooves 20 located at the ends of each module 14 are formed so as to be joined to two lateral grooves 21. In detail, each second groove 20 of the two second grooves at the ends of each module is joined to a lateral groove 21 so as to form a single groove extending from the axially outermost edge of the tyre shoulder to the equatorial plane X-X, at least partially going beyond the latter.

The two second grooves 20 located substantially at the ends of each module 14, in the embodiment shown in FIG. 2, have only one axial end 24 spaced away from the adjacent first groove 19 by a distance s to form a substantially continuous tread portion.

Still referring to the embodiment shown in FIG. 2, the two inner second grooves 20 of each module 14 substantially extend in the central annular portion A between a pair of first grooves 19. Each inner second groove 20 further has both ends 24 spaced away from the adjacent first groove 19 by a distance s to form a substantially continuous tread portion.

The axial spacing of the second grooves 20 from the first grooves 19 makes the tread band solid portions 27 substantially tied up with one another, ensuring stability when running on straight paths on roads, without compromising traction when running off-road.

In FIG. 3 tread band pattern of a second embodiment of a tyre according to the invention, particularly adapted to be mounted on the front wheel of a motorcycle, is shown.

In this embodiment the module 14 comprises three second grooves 20 located substantially transversally with respect to the equatorial plane X-X; in particular two second grooves 20 located substantially at the ends of each module and an inner one comprised between the previous two.

The two second grooves 20 located substantially at the ends of each module 14 are formed so as to be joined to two lateral grooves 21. In detail, each second groove 20 of the two second grooves at the ends of each module is joined to a lateral groove 21 so as to form a single groove extending from the axially outermost edge of the tyre shoulder to the equatorial plane X-X, at least partially going beyond the latter.

The two transverse second grooves 20 at the ends of each module 14 have only one axial end 24 spaced away from the adjacent first groove 19 by a distance s to form a substantially continuous tread portion.

Vice versa, the transverse second groove 20 having an inner location with respect to the two second grooves at the ends of each module 14 extends in the central annular portion A between a pair of first grooves 19.

The inner transverse second groove 20 of each module 14 has both ends spaced away from the adjacent first groove 19 by a distance s to form a substantially continuous tread portion.

Figure 4:
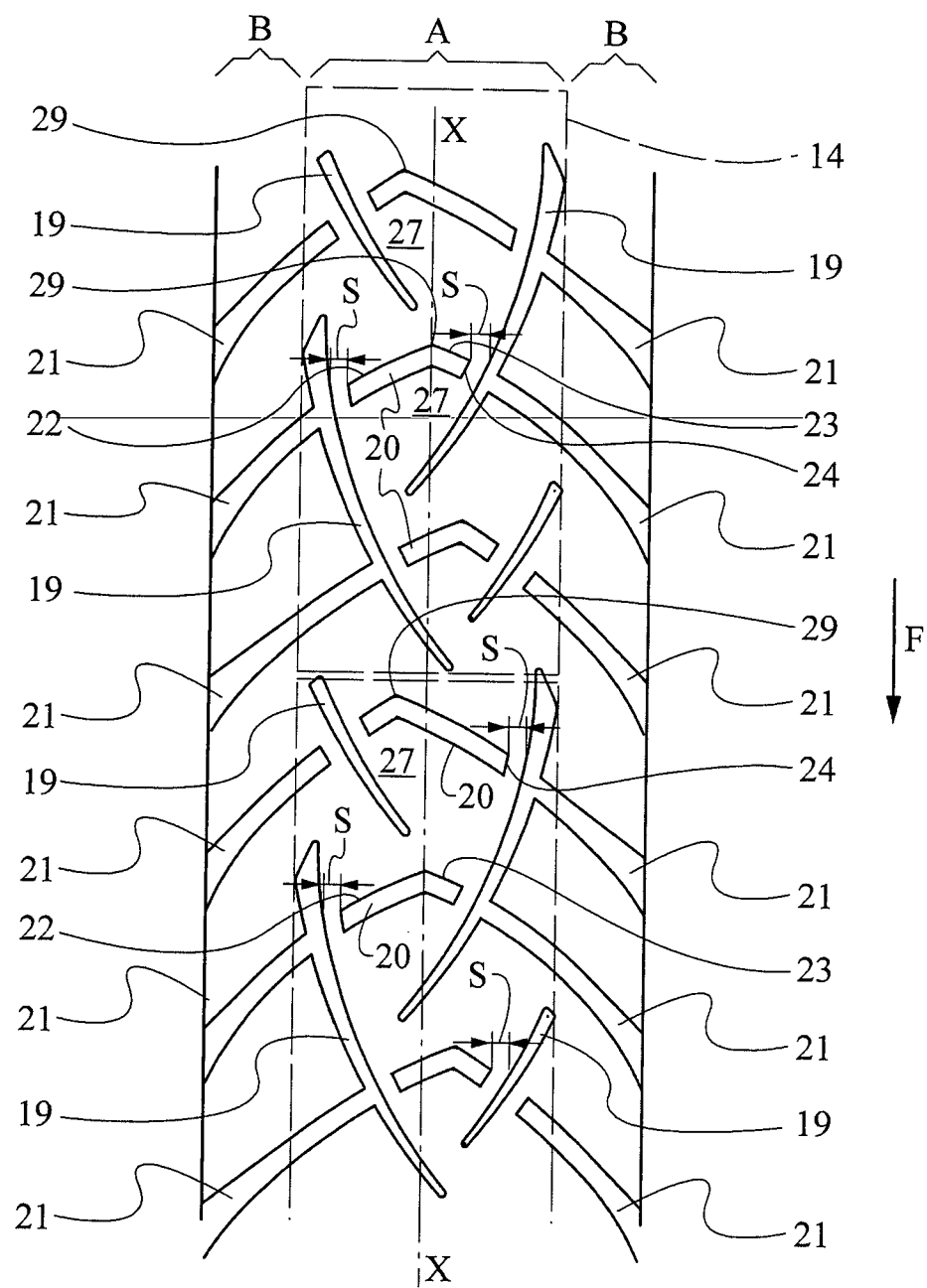
FIG. 4 shows a portion of the plan development of a portion of the tread band of a third embodiment of a front tyre according to the present invention.

In FIG. 4 a tread band pattern of a third embodiment of a tyre according to the invention, particularly adapted to be mounted on the front wheel of a motorcycle, is shown.

In this embodiment the module 14 comprises three second grooves 20 and two pairs of first grooves 19.

The three second grooves 20, two located substantially at the ends of the module 14 and an inner one, comprised between the previous two, are located substantially transversally with respect to the equatorial plane X-X.

In each module 14, as mentioned above, there are two pairs of first grooves 19, and in each pair a groove 19 has greater extension than that of the other one.

For ensuring a substantially symmetrical distribution of the first grooves 19 in the circumferential direction, thus favouring a greater behaviour stability of the tyre, in each module 14 the pairs of first grooves 19 are arranged so that each first groove 19 of lesser extension alternates in circumferential direction with a first groove 19 of greater extension.

In this embodiment the second grooves 20 of each module have both ends 24 spaced away from the adjacent first groove 19 by a distance s so as to form a substantially continuous tread portion.

Also in this case, the axial spacing of the second grooves 20 from the first grooves 19 makes the tread band solid portions 27 substantially tied up with one another, ensuring stability when running on straight paths on roads, without compromising traction when running off-road.

In FIG. 5 a tread band pattern of a further embodiment of a tyre according to the invention, particularly adapted to be mounted on the rear wheel of a motorcycle, is shown.

This embodiment is basically obtained by rotating the tread pattern of FIG. 2 by 180° and by setting new dimensions for the grooves, based on the size and curvature of the tyre for which the embodiment is intended.

Tests

The Applicant carried out a series of tests on different kind of grounds with tyres according to the invention and comparison tyres. In particular, tests running off-road on not much demanding terrains (substantially dirt roads and/or gravel road), tests of traction on straight paths, tests of traction on bends, test of absorption of terrain bumps were carried out.

In the tests tyres were compared having size 110/80 R 19, with the same compound and carcass and belt structure, mounted on the wheels of a BMW R1200 GS. Tyres of the model Tourance EXP™ (comparison) were compared with tyres (invention) comprising a tread band having a pattern as that shown in previous FIG. 2.

In order to assess the aforesaid parameters, the test driver performed some typical manoeuvres on a track (predetermined off-road path). Afterwards, the test driver assessed the tyre behaviour and gave a score depending on the tyre performance during said manoeuvres.

The results of these tests are expressed by means of an assessment scale representing the subjective judgment expressed by the test driver by means of a score system. The values reported in the following table represent an average of the values obtained in many test sessions (5-6 tests) and provided by several test drivers. Table 1 shows the results obtained (in terms of deviation from the reference tyre, to which a value equal to 100 was conventionally given) by the tyres according to the invention.

TABLE 1

|  | COMPARISON TYRE | INVENTION |
|---|---|---|
| Running off-road on not much demanding terrains | 100 | 100 |
| Traction on straight paths | 100 | 110 |
| Traction on bends | 100 | 100 |
| Absorption of terrain bumps | 100 | 95 |

The Applicant also carried out a series of further tests on roads, always comparing the tyre according to the invention and the same kind of reference tyre used for the previous tests.

In particular, test were carried out on a track on roads for assessing draining, stability, manoeuvrability and mileage.

The size of the tyres and the kind of motorcycle were the same as in the previous off-road tests.

Table 2 shows the results obtained (in terms of deviation from the reference tyre, to which a value equal to 100 was conventionally given) by the tyres according to the invention.

TABLE 2

|  | COMPARISON TYRE | INVENTION |
|---|---|---|
| Front tyre draining | 100 | 110 |
| Rear tyre draining | 100 | 110 |
| Stability | 100 | 100 |
| Handling | 100 | 100 |
| Front tyre mileage | 100 | 120 |
| Rear tyre mileage | 100 | 110 |

The tyre according to the invention has a better behaviour as compared to the comparison tyre substantially in all of the assessed features.

As it can be noted, keeping other structural features of tyre the same, the contribution given by the tread pattern turns out to be important for the tyre behaviour both when running on roads and when running off-roads.

In fact, the new tyre turns out to be comparable, if not even slightly better in almost all of the assessed features as compared to the comparison tyre. In this respect it is recalled that the comparison tyre is one the best of its category, very much appreciated by the motorcyclists for its excellent features of drivability, grip, handling and stability both when running on roads an off-road.

In particular, its tread band contributes to achieving a suitable contact surface in different driving condition (on straight paths and/or on bends), and ensures adequate water draining when running out of a track on wet asphalt.

The present invention has been described with reference to some embodiments thereof. Many modifications can be made in the embodiments described in detail, still remaining within the scope of protection of the invention, defined by the following claims.

The invention claimed is:

1. A tyre for motorcycles, having a tread band comprising a central annular portion symmetrically located astride an equatorial plane and two shoulder annular portions located on axially opposite sides with respect to the central annular portion, the tread band having a void-to-rubber ratio not greater than 25%;

the central annular portion having an axial extension not greater than 65% of the axial development of the tread band and said central portion having at least one module circumferentially repeated;

each shoulder portion having an axial extension not greater than 40% of the axial development of the tread band; and said module comprising at least one pair of first grooves with substantially circumferential course, at least partially located on opposite sides with respect to the equatorial plane, wherein:

the central annular portion has a void-to-rubber ratio not smaller than 10% and said module comprises a plurality of second grooves located substantially transversally with respect to the equatorial plane, said substantially transverse second grooves defining in each module together with said substantially circumferential first grooves at least two tread band solid portions, said second grooves having at least one end spaced away from an adjacent first groove by a distance so as to form a substantially continuous tread portion adapted to connect at least two tread band solid portions, and in a same module, at least one second groove is located between two first grooves so as to cross the equatorial plane.

2. The tyre according to claim 1, wherein a first groove of lesser extension has an extension greater than or equal to a second groove of greatest extension.

3. The tyre according to claim 1, wherein at least one of said second grooves has at least two ends, each spaced away from an adjacent first groove by said distance so as to form a substantially continuous tread portion adapted to connect at least two tread band solid portions.

4. The tyre according to claim 1, wherein the first and the second grooves have an average depth smaller than 10 mm.

5. The tyre according to claim 1, wherein said distance is greater than 0.01 L, where L is a length of an arc defining a radially outermost profile of the tread band in a radial section of the tyre.

6. The tyre according to claim 5, wherein said distance s is smaller than 0.2 L.

7. The tyre according to claim 1, wherein all axial ends of the second grooves are spaced away from the first grooves so as to form a tread portion substantially continuous in a circumferential direction.

8. The tyre according to claim 1, wherein the second grooves comprise at least one first and at least one second segment inclined with respect to said first segment to form a convexity oriented oppositely to a rolling direction of the tyre, in a tyre intended to be mounted on a front wheel of a motorcycle.

9. The tyre according to claim 8, wherein the first and the second segment of the second grooves have a different extension.

10. The tyre according to claim 1, wherein the second grooves comprise at least one first and at least one second segment inclined with respect to the first segment to form a vertex.

11. The tyre according to claim 10, wherein vertexes have all a same orientation in a circumferential direction.

12. The tyre according to claim 10, wherein vertexes are axially spaced away from the equatorial plane.

13. The tyre according to claim 10, wherein, in a same module vertexes of two circumferentially consecutive second grooves are located axially on opposite sides with respect to the equatorial plane.

14. The tyre according to claim 1, wherein the second grooves have an axial extension smaller than 0.4 L.

15. The tyre according to claim 14, wherein the second grooves have an axial extension greater than 0.1 L.

16. The tyre according to claim 1, wherein each first groove has a circumferential extension smaller than 15% of a total circumferential development of the tyre.

17. The tyre according to claim 1, wherein each first groove has a circumferential extension smaller than 300 mm.

18. The tyre according to claim 1, wherein, in each module, the first grooves of each pair are mutually staggered in a circumferential direction.

19. The tyre according to claim 18, wherein, in each module, the first grooves of each pair are mutually staggered in a circumferential direction at most by half the pitch.

20. The tyre according to claim 1, wherein, in each module, the first grooves of each pair are arranged according to an arc of a circle.

21. The tyre according to claim 1, wherein a first segment of the second grooves is inclined with respect to the equatorial plane so as to form an angle in a range between 90° and 140° for a front tyre.

22. The tyre according to claim 1, wherein a first segment of the second grooves is inclined with respect to the equatorial plane so as to form an angle in a range between 0° and 45° for a rear tyre.

23. The tyre according to claim 1, wherein a second segment of the second grooves is inclined with respect to the equatorial plane so as to form an angle in a range between 90° and 140° for a front tyre.

24. The tyre according to claim 1, wherein a second segment of the second grooves is inclined with respect to the equatorial plane so as to form an angle in a range between 0° and 40° for a rear tyre.

25. The tyre according to claim 1, wherein lateral grooves have a depth greater than 4 mm at an end close to the central annular portion.

26. The tyre according to claim 1, wherein, for each module, at least one second groove is connected with a lateral groove.

27. The tyre according to claim 1, wherein, for each module, at least two second grooves are connected with two lateral grooves.

* * * * *